(12) United States Patent
Chang et al.

(10) Patent No.: US 10,025,819 B2
(45) Date of Patent: Jul. 17, 2018

(54) GENERATING A QUERY STATEMENT BASED ON UNSTRUCTURED INPUT

(71) Applicant: Adobe Systems Incorporated, San Jose, CA (US)

(72) Inventors: Walter Chang, San Jose, CA (US); Nikos Vlassis, Palo Alto, CA (US); Francisco Garcia, Amherst, MA (US)

(73) Assignee: Adobe Systems Incorporated, San Jose, CA (US)

( * ) Notice: Subject to any disclaimer, the term of this patent is extended or adjusted under 35 U.S.C. 154(b) by 699 days.

(21) Appl. No.: 14/540,602

(22) Filed: Nov. 13, 2014

(65) Prior Publication Data

US 2016/0140123 A1    May 19, 2016

(51) Int. Cl.
*G06F 17/30*    (2006.01)

(52) U.S. Cl.
CPC .................................. *G06F 17/3043* (2013.01)

(58) Field of Classification Search
CPC .................................................. G06F 17/3043
See application file for complete search history.

(56) References Cited

U.S. PATENT DOCUMENTS

| | | | | |
|---|---|---|---|---|
| 2008/0235199 | A1* | 9/2008 | Li | G06F 17/30401 |
| 2011/0093271 | A1* | 4/2011 | Bernard | G06F 17/2785 704/257 |
| 2013/0086067 | A1* | 4/2013 | Khoussainova | G06F 17/30646 707/737 |
| 2013/0158983 | A1* | 6/2013 | Jakubik | G06F 17/28 704/9 |
| 2013/0226846 | A1* | 8/2013 | Li | G06N 5/02 706/12 |
| 2014/0108423 | A1* | 4/2014 | Casella dos Santos | G06F 17/30598 707/748 |
| 2014/0310036 | A1* | 10/2014 | Grosso | G06Q 10/063 705/7.11 |
| 2014/0358904 | A1* | 12/2014 | Nayak | G06F 17/30864 707/723 |

\* cited by examiner

*Primary Examiner* — Kris E Mackes
(74) *Attorney, Agent, or Firm* — Kilpatrick Townsend & Stockton LLP

(57) ABSTRACT

Techniques for generating a query statement to query a dataset may be provided. For example, the query statement can be generated from natural language input, such as a natural language utterance. To do so, the input can be analyzed to detect a sentence, identify words in the sentence, and tag the words with the corresponding word types (e.g., nouns, verbs, adjectives, etc.). Expressions using the tags can be generated. Data about the expressions can be inputted to a classifier. Based on a detected pattern associated with the expressions, the classifier can predict a structure of the query statement, such as what expressions correspond to what clauses of the query statement. Based on this prediction, words associated with the expressions can be added to the clauses to generate the query statement and accordingly query the dataset.

20 Claims, 7 Drawing Sheets

GENERATING A QUERY STATEMENT BASED ON UNSTRUCTURED INPUT

TECHNICAL FIELD

This disclosure relates generally to techniques for generating queries to datasets.

BACKGROUND

Computing devices are used to access various types of information using web-based and other services. For example, a user can operate a computing device to access and use a search system (e.g., a search engine) to find information. Search systems can query a dataset storing various types of information. In one example, the dataset can store information from websites. Search results returned to the user's computing device include information from one or more of these websites. In another example, the dataset can store analytics associated with the websites. To illustrate, the dataset can include information related to visitors, products purchased from the website, the time of the visits, the location of the visitors, the number of the visitors, and other website-related information. In this example, search results returned to the user's computing device include analytics-related information, such as how many visitors visited the website from a particular location.

Searching datasets can require use of a predefined format for the search input. However, this approach is limited as it does not allow deviation from the predefined format nor complex natural language searches. Further, this approach does not facilitate querying an analytics dataset. Other existing approaches use specialized interfaces and languages. For example, analytics information (e.g., information related to websites, products, etc.) stored in some database systems can only be accessed using complex search tools that require a search created by someone familiar with each tool's particular search interface and query language. For example, a business person who is unfamiliar with a particular database's query language specifics may have to interact with an information analyst to run reports and queries to get desired business information.

Some search systems allow users to enter natural language searches to query a dataset to find information. Generally, such natural language systems attempt to translate each of the words used in the natural language search to create a query to the dataset. This word-by-word-based approach to natural language-to-query language translation often fails to identify and appropriately search for the search concepts desired by the searcher. For example, a given word may be identified for use in a select search clause when it needs to be in the where search clause for the search to yield the desired results. Search revisions and supplementation are often required, requiring the inefficient use of time and computing resources.

SUMMARY

One exemplary embodiment involves identifying words from a natural language request to search a dataset. The exemplary embodiment also involves associating each of the words with an identifier that identifies a part of speech type of the corresponding word. For example, a part of speech type identifies that a corresponding word is a particular part of speech, such as a noun, a verb, or an adjective. Additionally, the exemplary embodiment involves generating groupings of identifiers. For example, each of the groupings can include one or more of the identifiers. Further, the exemplary embodiment involves providing the words and the groupings to a machine learning classifier to generate a structured query to the dataset. The machine learning classifier can be configured to select a structure of the structured query based on the groupings and to use the words and the structure to generate the structured query. Further, the exemplary embodiment involves querying the dataset based on the structured query provided from the machine learning classifier.

These illustrative features are mentioned not to limit or define the disclosure, but to provide examples to aid understanding thereof. These and additional features may be implemented independently in various embodiments or may be combined in yet other embodiments, further details of which can be seen with reference to the following description and illustrations. Advantages offered by one or more of the various embodiments may be further understood by examining the specification or by practicing one or more of the various embodiments.

BRIEF DESCRIPTION OF THE FIGURES

These and other features, embodiments, and advantages of the present disclosure are better understood when the following Detailed Description is read with reference to the accompanying drawings.

DETAILED DESCRIPTION

Figure 1:
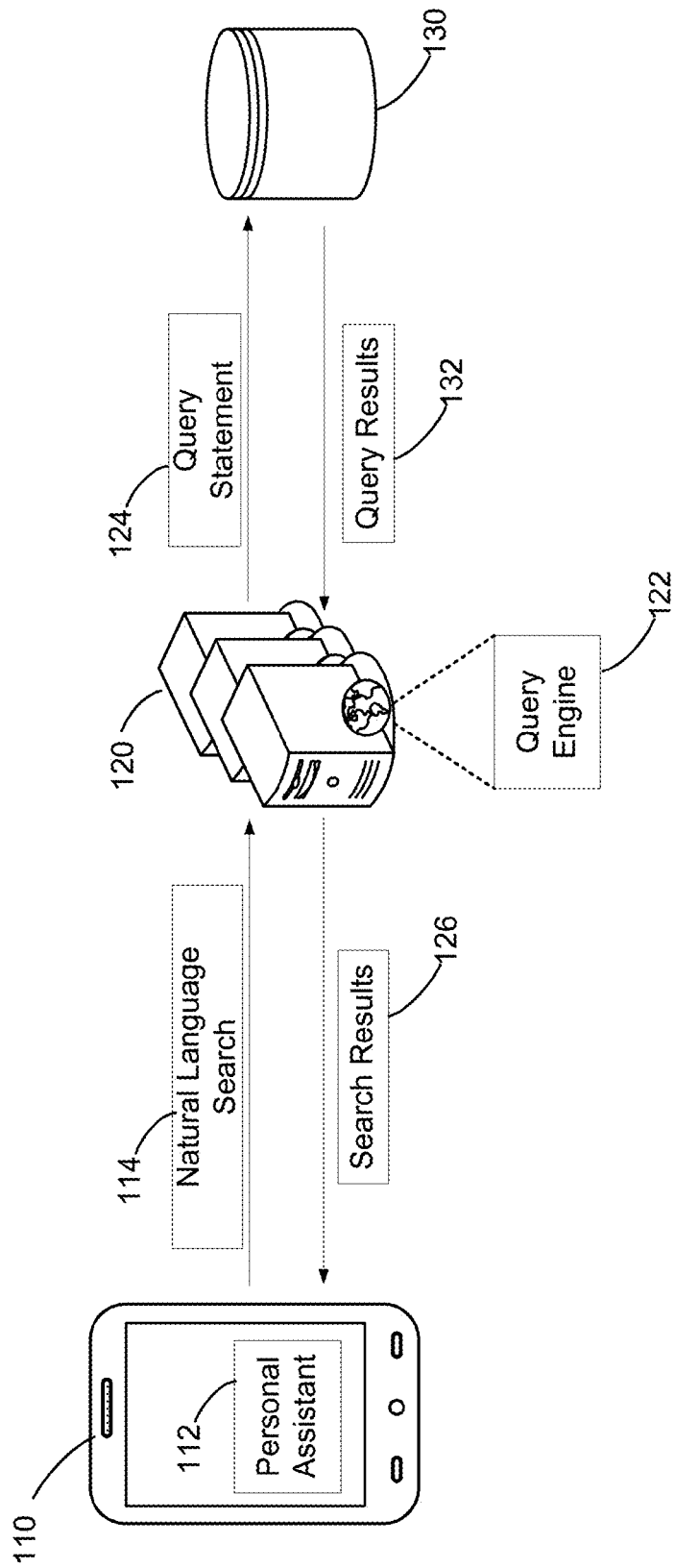
FIG. 1 illustrates an example environment for querying a dataset, according to certain embodiments of the present invention

Specific details of various exemplary embodiments of the present invention are set forth in the following description and are illustrated in FIGS. 1-7. The various embodiments described herein can be implemented in hardware, software, or a combination thereof. In the figures, similar symbols may identify similar components, unless context dictates otherwise. Certain well-known technology details, such as methods, apparatus, or systems that would be known by one of ordinary skill, are not set forth in the following description or in the figures to avoid unnecessarily obscuring the various examples. Those of ordinary skill in the relevant art will understand that they can practice other examples of the disclosed subject matter without departing from the scope and spirit of the present invention.

The embodiments described herein are directed to, among other things, generating a structured query to a dataset based on natural language search input. Translation of the natural language input into the query statements of the structured query can be based on the part of speech context of the words in the natural language search input. Specifically, this is accomplished by using patterns of the parts of speech of the words of the search input (e.g., adjective then noun then verb then noun, etc.) to identify appropriate respective query statement classes in which the words should be used. The use of such patterns historically can be used to better estimate how the words of the search should be used in the query. For example, the result may be that a given word that prior translation techniques would have used in a select search clause using will instead be used more appropriately in a where search clause, resulting in more accurate and efficient searching.

The phrase "structured query" refers herein to a machine, procedural or non-procedural, information retrieval request having one or more elements that must be specified in order to successfully query the dataset. The one or more elements represent a structure of the structured query and can include different clauses, such as select, where, from, order by, and other clauses. Examples of structured queries include structured query language (SQL), NoSQL, SPARQL, Boolean predicates, and other query types. A dataset can include a set of data that can be queried. For example, the dataset can represent a relational database, a NoSQL database, a MongoDB database, a CouchD database, or other databases.

The embodied techniques include receiving a natural language input, such as an utterance searching for information. This input can be processed to detect a sentence, identify words in the sentence, and tag the words with corresponding part of speech types (e.g., to indicate whether a word is a noun, verb, adjective, etc.). The techniques further include generating groupings from the part of speech types. For example, each grouping can group one or more tags (e.g., noun tags, verb tags, adjective tags, etc.) identifying the part of speech type(s) of the corresponding words. Rather than analyzing the words to determine what word belongs to what clause of the query, the techniques involve using the groupings to do so. For example, the techniques can implement a machine learning classifier to predict, based on a pattern formed by the groupings, that one clause is associated with particular groupings while another clause is associated with other groupings. Once the prediction is available, words can then be added accordingly to the clauses to generate the query. For example, if the prediction indicates that a noun grouping (e.g., a grouping containing a noun tag corresponding to a noun) belongs to a select clause of an SQL query, the noun corresponding to that noun grouping can be added to the select clause. In comparison, if the prediction was for a where clause, the noun would be added to the where clause instead.

Unlike previous techniques, by first predicting a structure of a query based on groupings (e.g., what clauses are associated with what groupings) and then adding actual words to the query, the embodied techniques improve or allow a number of functions. For example, instead of requiring a very large number of natural language inputs (e.g., specific training sentences and words) to train the classifier, it may be sufficient to perform the training by using a much lower number of generic groupings. Further, using the groupings may allow the classifier to predict query structures in response to any natural language input, regardless of the underlying vocabulary (e.g., the actual words). Thus, the natural language need not be limited to a predefined set of acceptable vocabulary. This also allows processing not only simple, but also complex natural language searches including searches to query analytics datasets. In addition, because a predefined set of acceptable vocabulary need not be used, a dataset need not be annotated according to the vocabulary to enable the querying. Thus, datasets can be updated or added with much lower effort.

In the interest of clarity of explanation, an example of "show me the zip codes in California" for a natural language search is illustrated and discussed herein. However, the various embodiments are not limited as such. Instead, the natural language search can represent a more complex search request. In particular, queries to an analytics dataset that stores information related to websites, products, etc., typically use complex natural language searches. The complexity stems from the use of a larger number of words or terms that should be detected and mapped to an element of the query. To illustrate, a natural language search to a dataset storing website traffic information can be "tell me about the number of visitors that visited the website per location of the visitors, and for the most frequent location, tell me what products were bought ordered in a descending price." However, regardless of the complexity of the natural language search, generating the query can involve grouping part of speech types corresponding to words from the natural language search and providing the groupings and the words to a machine learning classifier to generate the query.

Turning to FIG. 1, that figure illustrates an example computing environment for querying one or more datasets. In general, a user operates a computing device 110 to search for information organized in one or more datasets 130 (which may be referred to as a "dataset 130" in the interest of clarity of explanation). The computing device 110 interacts with a server 120, or some other computing device, over a network to search and receive the information. The server 120 can implement a query engine 122 configured to query the dataset 130. In an embodiment, the dataset 130 stores and organizes information from one or more information sources. For example, the dataset 130 can include one or more databases, some of which may be relational databases and some of which may not be relational databases. Each of the databases can include information from or about an information source. As such, information in the dataset 130 can be queried using a structured query.

In an embodiment, the computing device 110 may be any type of suitable computing devices, such as a mobile phone, a smart phone, a tablet, a laptop, a desktop computer, a thin client, or any other type of computing devices. In particular, the computing device 110 can host a personal assistance application 112. This application 112 is configured to allow the user to input a natural language search 114. The natural language search 114 represents unstructured input, such a natural language text or a natural language utterance translated in a natural language text. For example, by operating the personal assistant application 112, the user can dictate a "show me the zip codes in California" search. The natural language search 114 can be submitted to the server 120 through, for example, a web request or an application programming interface (API) call. In turn the query engine 122 of the server 120 can generate a query statement 124 to query the dataset 130. In another example, rather than submitting the natural language search 114, the personal assistant application 112 can be further configured to translate the natural language search 114 into the query statement 124, using similar techniques as the ones implemented by the query engine 122. Regardless of whether a search or a query is submitted, the computing device 110 can receive back search results 126 from the server 120. In turn, the application can present the search results 126 to the user.

The server 120 may be any type of suitable computing devices, such as one or more servers, a collection of computing devices, a collection of virtual machines, a hosted computing environment, a cloud computing environment, or any other type of computing devices. In particular, the server 120 can host the query engine 122. This engine 122 can be configured to perform various operations including querying the dataset 130 and providing query results based on the queries.

For example, in response to the natural language search 114 from the computing device 110, the query engine 122 translates the natural language search 114 into the query statement 124. The query statement 124 represents a structured query used to query the dataset 130. The query engine 122 further ranks and filters query results 132 received from the dataset 130 and, accordingly, returns the search results 126 to the computing device 110.

In an embodiment and unlike previous techniques, the query engine 122 need not limit the natural language search 114 to a predefined set of acceptable vocabulary. Instead, the natural language search 114 can include any natural language or unstructured input. Further, the dataset 130 need not be annotated according to the predefined set of acceptable vocabulary. Instead, the dataset can include any type of databases or other types of datasets. It may be sufficient to include annotations of the content of the dataset 130 (e.g., annotations that include column headers describing the columns in a database). This may provide efficiency and scalability in querying the dataset 130 and adding new data to the dataset 130.

In particular, the query engine 122 can translate the natural language search 114 into the query statement 124 using a plurality of modules and operations. These modules and operations are further described in the next figures. Briefly, the query engine 122 can implement a hierarchical (e.g., two-level) machine learning classifier and other modules. The modules are configured to enable the query engine 122 to detect a sentence from the natural language search 114, identify groupings from words of the sentence, and predict a structure of the query statement 124 based on the groupings. Further, the modules are configured to enable the query engine 122 to generate the query statement 124 from the words based on the predicted query structure, expand the query statement 124 to include related terms, and query the dataset 130 accordingly.

As used herein, a sentence represents a portion of natural language input, such as a string of natural language text. The sentence generally follows grammatical rules and includes words. An example sentence is "show me the zip codes in California." A word represents a unit of a sentence and is associated with a part of speech type. A part of speech type can identify the type of the word according to the grammatical rules, such as what particular part of speech the word represents (e.g., a noun, a verb, an adjective, an adverb, a preposition, etc.). In the sentence example, each of "show," "me," "the," "zip," "codes," "in," and "California" is a word and the respective part of speech type is "verb," "pronoun," "determiner," "noun," "noun," "preposition," and "proper noun." An identifier can be used to identify a part of speech type of a word. For example, a word can be tagged with a tag (e.g., a noun tag) to identify that the word is of a particular part of speech type (e.g., the word is a noun).

A grouping can be associated with one or more words and represents the associated part of speech type(s). For example, the grouping can group one or more identifiers corresponding to one or more words and identifying the corresponding one or more part of speech types. In particular, the grouping can be associated with a single word or can be associated with a plurality of words. If the grouping is associated with a single word, that grouping can include an identifier of the corresponding part of speech types. For example, if the word is tagged with a noun, verb, adjective, or another part of speech tag, the grouping can include such a part of speech tag. In comparison, if the grouping is associated with a plurality of words, that grouping can include identifiers of the corresponding part of speech types or can include a single identifier applicable to the corresponding part of speech types. For example, if a grouping is associated with two nouns, the grouping can include two noun tags or a single noun tag. In another example, the grouping can include a sequence of tags corresponding to words that the grouping represents. In an embodiment, a grouping follows the Penn Treebank format. In such a case, the grouping may also be referred to as an expression. For example, a noun expression can represent a grouping that includes at least one noun. In comparison, a verb expression can represent a grouping that includes at least one verb. As such, the following identifiers (e.g., tags) and groupings can be used:

| Words: | Show | me | the | zip | codes | in | California |
|--------|------|-----|-----|-----|-------|-----|------------|
| Identifiers: | VB | PRP | DT | NN | NN | IN | NNP |
| Groupings: | VX | NX | \------ | NX | ------/ | IN | NX | where VB is a verb, PRP is a pronoun, DT is a determiner, NN is a noun, IN is a preposition, and NNP is a proper noun, and where VX is a verb expression, NX is a noun expression, and IN is a preposition expression.

A structure of a query to a dataset identifies elements (e.g., clauses and clause classes) of the query. Said differently, a query to a dataset can be generated by populating the structure (e.g., the elements) with words. For example, the structure of an SQL query comprises a "select" clause, a "where" clause, and other classes of clauses. In the previous sentence example, an applicable SQL query can include "select='zip codes' where 'State=California'."

In an illustrative use case, the user of the computing device 110 may input at the personal assistant application 112 the search to "show me the zip codes in California." The dataset 130 includes a relational database that stores geographical information from multiple information sources about the different States, including a column identifying the States and a column identifying the zip codes. In response to the search, the query engine 120 can generate an SQL query including the "zip codes" as the select clause and "California" as the where clause. This SQL query would return the different zip codes of California from the relational database.

In another illustrative user case, the user of the computing device 110 may be interested to learn about visitors to a web site. As such, the user may input a search for "tell me where did visitors of the web site come from the most" at the personal assistant application 112. The dataset 130 includes a NoSQL database storing analytics about visitors to the web site. For example, this database can store who, what, when, where, where, and how many attributes of the visitors, such as information about the visitors, products purchased from the website, the time of the visits, the location of the visitors, and the number of the visitors. In response to the search, the query engine 120 can generate a NoSQL query to search for the where and how many attributes. This NoSQL query could return the number of visitors per location in a descending order.

Figure 2:
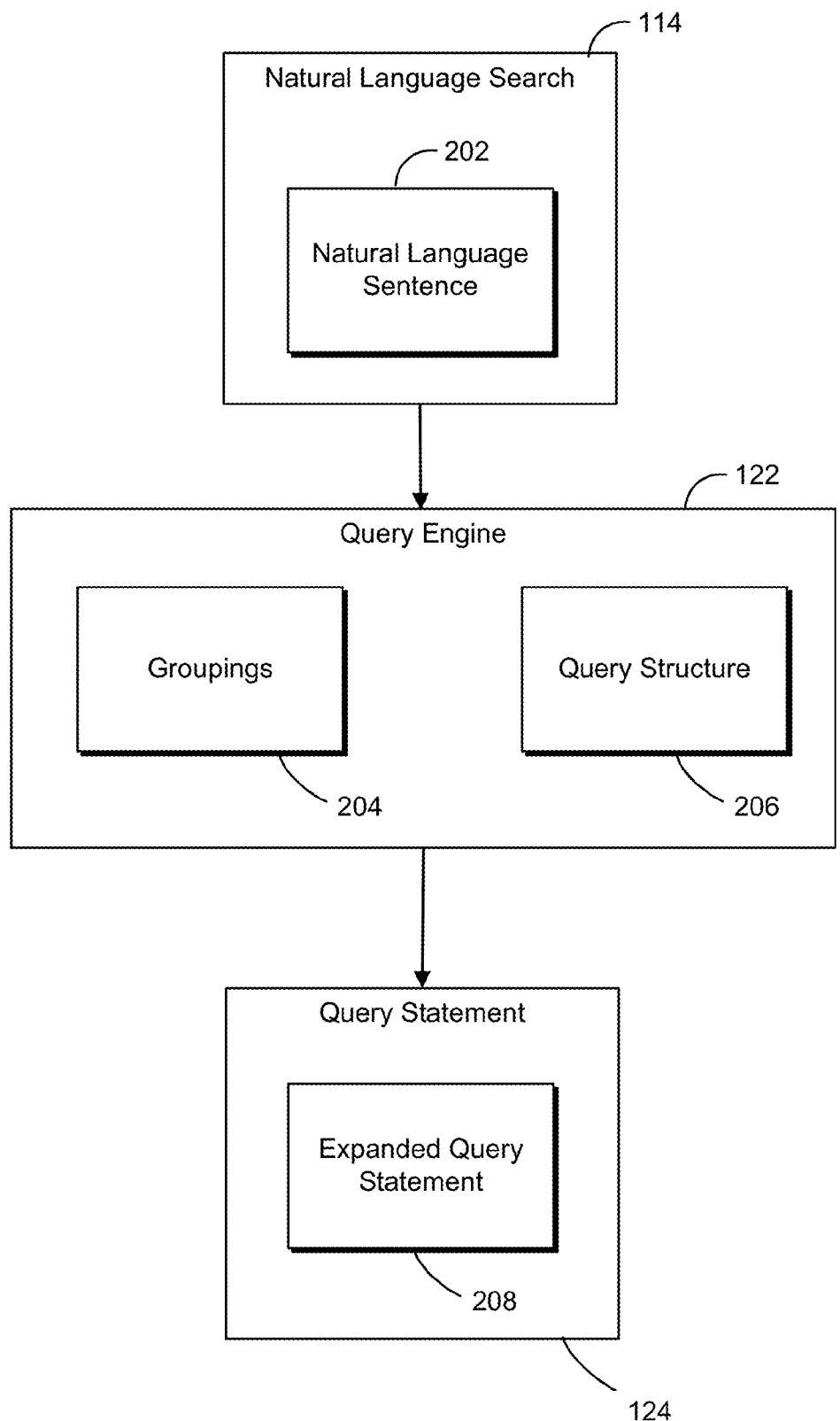
FIG. 2 illustrates an example query engine for generating a query statement, according to certain embodiments of the present invention.

Turning to FIG. 2, that figure illustrates an example of the query engine 122 for generating a query to a dataset. As described herein above, the query engine 122 is configured to process the natural language search 114 to output the query statement 124. More particularly, this processing involves using, for example, a multi-hierarchical machine learning classifier. This allows the query engine 122 to output the query statement 124 by first predicting a query structure 206 and then generating the query statement 124 from the query structure 206. Predicting the query structure 206 can use groupings 204 generated from the natural language search 114, rather than actual words of the natural language search 114. In comparison, generating the query statement 124 can involve adding the actual words of the query statement 124 according to the query structure 206.

As such, the query engine 122 can receive the natural language search 114 and generate the groupings 204. Thereafter, the query engine can predict the query structure 206 from the groupings 204 and generate the query statement 124 from the actual words based on the query structure 206. This may improve the efficiency and accuracy of generating query statements. That is because groupings can abstract natural language searches according to word types and grammar rules, whereas actual words of these searches are specific instances. As such, instead of requiring a huge number of natural language search examples to train the query engine 122 (e.g., the multi-hierarchical machine learning classifier), it may be sufficient to perform the training by using a much lower number of generic groupings. Further, using the groupings may allow the query engine 122 to predict query structures for any natural language search, regardless of the search vocabulary. As such, the natural language searches need not be limited to a predefined set of acceptable vocabulary. Additionally, predicting query structures may allow generating query statements from any natural language search for any type of dataset. As such, the dataset need not be specially annotated according to an acceptable vocabulary.

As illustrated in FIG. 2, the natural language search 114 includes, for example, a natural language sentence 202. Generally, this sentence 202 contains words in a text form. The query engine 122 can process the natural language sentence 202 to recognize the words, identify the corresponding word types, and generate the groupings 204 based on the word types. Although a natural language sentence is illustrated, other types of natural language input and, more generally, unstructured input can be similarly used. For example, the natural language search 114 can include audio, images, video, or other non-text based input. Non-text input can be translated into a text form to generate sentences using various techniques. These techniques can include one or more of optical character recognition, image recognition, machine learning, captioning, tagging, speech-to-text, or other techniques available to convert the non-text content into text.

In addition to predicting the query structure 206 based on the groupings 204 and generating the query statement 124 based on the query structure 206, the query engine 122 can expand the query statement 124, resulting in an expanded query statement 208. The expanded query statement 208 represents a version of the query statement 124. In one version, the expanded query statement 208 adds related terms to the query statement 124. In another version, the expanded query statement 208 replaces words from the query statement with related terms. In either version, a related term represents one or more words related to an actual word from the natural language search 114. To illustrate, if the query statement 124 includes "zip codes" as a clause from the "show me the zip codes in California" search, the expanded query statement 208 can additionally or alternatively include "area codes" in that clause. To expand the query statement 124, the query engine can use a number of related term datasets, such as a WordNet database, thesaurus dictionaries, ontology trees, and other datasets, as further illustrated in the next figures. Expanding the query statement 124 may improve the efficiency and accuracy of the query. For example, the expanded query statement 208 can allow looking for and finding attributes in a dataset that, otherwise, may be unfound if the actual words of the natural language search 114 were used.

Figure 3:
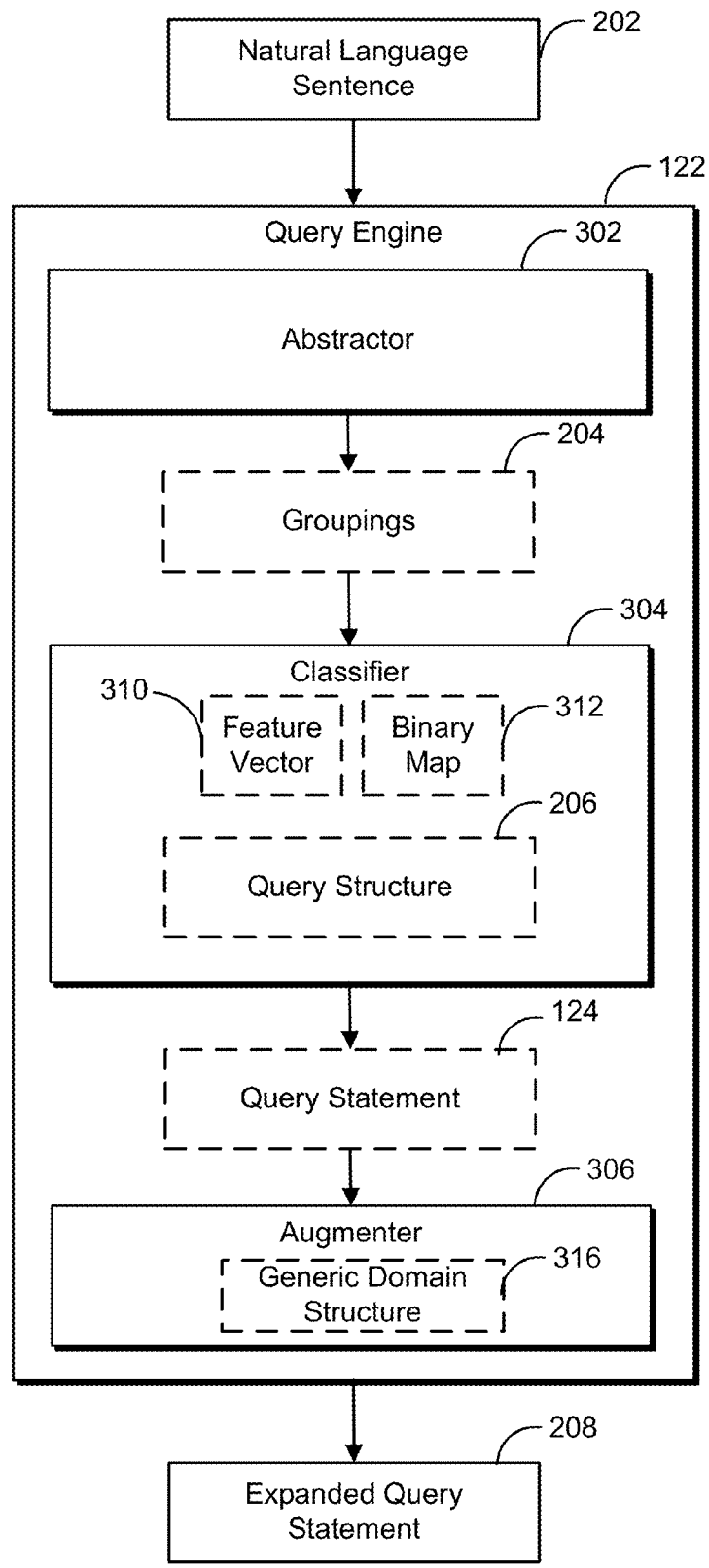
FIG. 3 illustrates an example architecture of a query engine configured to generate a query statement, according to certain embodiments of the present invention.

Turning to FIG. 3, that figure illustrates an example architecture of the query engine 122. As illustrated, the query engine 122 receives the natural language sentence 202 as an input and outputs the expanded query statement 208. However, other natural language inputs may be similarly received and processed, and other query statements may be similarly outputted. To output the expanded query statement 208 from the natural language sentence 202, the query engine 122 can implement a number of modules, including an abstractor 302, a classifier 304, and an augmenter 306. In an embodiment, these modules can be separate from but interface with each other. In another embodiment, some or all of the modules can be integrated. Generally, a module represents hardware, software implementable on hardware, or a combination of both. For example, a module can include computer-readable instructions that, when executed on a processor, configure the processor to perform a function.

In an embodiment, the abstractor 302 is configured to receive and process the natural language sentence 202 to output the groupings 204. To do so, the abstractor 302 can implement a sentence segmenter, a tokenizer, a part-of-speech tagger, and a grouping tagger. In an example, the SEDONA tagger available from ADOBE Systems, Inc. of San Jose, Calif., the E. Brill tagger, or another rule-based or stochastic tagger can be used. As such, the abstractor 302 parses the natural language sentence 202, identifies the words with the sentence, determines the word types (e.g., noun, verb, adjective, etc.), and generates the groupings 204 (e.g., noun groupings, verb groupings, adjective groupings, etc.).

In comparison, the classifier 304 is configured to receive and process the groupings 204 to predict the query structure 206 and accordingly output the query statement 124. Predicting the query structure 206 can involve determining what groupings belong to what clauses of the query statement 124. In comparison, outputting the query statement 124 can involve adding the actual words corresponding to the groupings to the clauses.

Generally, the classifier 304 can generate the prediction based on a pattern formed by the groupings 204. This pattern can be based on an order of corresponding words in the natural language sentence 202. For example, the classifier 304 can be configured to predict the query statement (e.g., query statement classes and what words belong to what class) based on the pattern of the groupings. To do so, the classifier 304 can implement a machine-learning algorithm, such as random forest. The machine-leaning algorithm can be trained based on previous observations for patterns of multiple query statement classes and can use a similarity or distance function. As such, the machine-learning algorithm can predict the query statement by comparing the data about the pattern of the groupings to the past observations.

In an embodiment, the classifier 304 (or, alternatively, the abstractor 302 or another module of the query engine 122) generates a feature vector 310 storing features, where the features correspond to the groupings 204. Based on this vector 310, the classifier 304 detects the pattern of the groupings to generate the prediction. In particular, the classifier 304 can detect the pattern based on distances between the features of the feature vector 310 as further described herein next.

The feature vector 310 represents an array storing the features. A feature corresponds to a grouping or an identifier (e.g., tag) from the grouping. For example, if noun groupings (NX) are to be analyzed to predict which part of the query structure 206 they belong to, any other grouping types (e.g., VX, IN, etc.) can be set as a feature. For the noun groupings themselves, each identifier within a noun grouping (e.g., NN, NNP, DT, etc.) can be set as a feature. As such, the feature vector 310 can include a sequence of identifiers (e.g., tags).

To illustrate, consider the previous sentence example, where:

| Words: | Show | me | the | zip | codes | in | California |
|---|---|---|---|---|---|---|---|
| Identifiers: | VB | PRP | DT | NN | NN | IN | NNP |
| Groupings: | VX | NX | \------ | NX | ------/ | IN | NX. |

In this example, the feature vector could be:

| Feature vector: | VX | PRP | DT | NN | NN | IN | NNP. |
|---|---|---|---|---|---|---|---|

To determine the distance between the features and, thus, detect the pattern, the features need to be represented with numerical values. In particular, machine-learning algorithms, such as a random forest, use numerical values. In such algorithms, distances between the features can be measured from the differences between the numerical values, where these differences bias the prediction. To do so, in an embodiment, each feature in the feature vector 310 can be represented using a binary representation. This would result in a binary map 312 representing the feature vector 310. In addition, a fixed length vector can be used such that the analysis can follow a common approach across all vectors. Thus, a missing feature from the feature vector 310 can be filled out with a default tag, such as a no-op tag (e.g., a tag that serves no purpose other than filling out the feature vector 310). An example of the binary map 312 for analyzing noun groupings includes:

```
binary_feature_mapping = { \
"NO-OP": [0, 0, 0, 0, 0, 0, 0, 0, 0, 0, 0, 0, 0, 0, 0, 0, 0, 0, 0, 1], \
"NN": [0, 0, 0, 0, 0, 0, 0, 0, 0, 0, 0, 0, 0, 0, 0, 0, 0, 0, 1, 0], \
"NNS": [0, 0, 0, 0, 0, 0, 0, 0, 0, 0, 0, 0, 0, 0, 0, 0, 0, 1, 0, 0], \
"NNP": [0, 0, 0, 0, 0, 0, 0, 0, 0, 0, 0, 0, 0, 0, 0, 0, 1, 0, 0, 0], \
"NNPS": [0, 0, 0, 0, 0, 0, 0, 0, 0, 0, 0, 0, 0, 0, 0, 1, 0, 0, 0, 0], \
"DT": [0, 0, 0, 0, 0, 0, 0, 0, 0, 0, 0, 0, 0, 0, 1, 0, 0, 0, 0, 0], \
"IN": [0, 0, 0, 0, 0, 0, 0, 0, 0, 0, 0, 0, 0, 1, 0, 0, 0, 0, 0, 0], \
"JJ": [0, 0, 0, 0, 0, 0, 0, 0, 0, 0, 0, 0, 1, 0, 0, 0, 0, 0, 0, 0], \
"VX": [0, 0, 0, 0, 0, 0, 0, 0, 0, 0, 0, 1, 0, 0, 0, 0, 0, 0, 0, 0], \
"CC": [0, 0, 0, 0, 0, 0, 0, 0, 0, 0, 1, 0, 0, 0, 0, 0, 0, 0, 0, 0], \
"PRP": [0, 0, 0, 0, 0, 0, 0, 0, 0, 1, 0, 0, 0, 0, 0, 0, 0, 0, 0, 0], \
"PRP$": [0, 0, 0, 0, 0, 0, 0, 0, 1, 0, 0, 0, 0, 0, 0, 0, 0, 0, 0, 0], \
",": [0, 0, 0, 0, 0, 0, 0, 1, 0, 0, 0, 0, 0, 0, 0, 0, 0, 0, 0, 0], \
".": [0, 0, 0, 0, 0, 0, 1, 0, 0, 0, 0, 0, 0, 0, 0, 0, 0, 0, 0, 0], \
".": [0, 0, 0, 0, 0, 1, 0, 0, 0, 0, 0, 0, 0, 0, 0, 0, 0, 0, 0, 0], \
"WP": [0, 0, 0, 0, 0, 1, 0, 0, 0, 0, 0, 0, 0, 0, 0, 0, 0, 0, 0, 0], \
"UNK": [0, 0, 0, 0, 0, 1, 0, 0, 0, 0, 0, 0, 0, 0, 0, 0, 0, 0, 0, 0], \
"JJS": [0, 0, 0, 0, 1, 0, 0, 0, 0, 0, 0, 0, 0, 0, 0, 0, 0, 0, 0, 0], \
"FW": [0, 0, 0, 0, 1, 0, 0, 0, 0, 0, 0, 0, 0, 0, 0, 0, 0, 0, 0, 0], \
"CD": [0, 0, 0, 1, 0, 0, 0, 0, 0, 0, 0, 0, 0, 0, 0, 0, 0, 0, 0, 0], \
"WDT": [0, 0, 1, 0, 0, 0, 0, 0, 0, 0, 0, 0, 0, 0, 0, 0, 0, 0, 0, 0], \
"WRB": [0, 1, 0, 0, 0, 0, 0, 0, 0, 0, 0, 0, 0, 0, 0, 0, 0, 0, 0, 0], \
"MD": [1, 0, 0, 0, 0, 0, 0, 0, 0, 0, 0, 0, 0, 0, 0, 0, 0, 0, 0, 0]
}
``` where each element within a " " represents a tag of a feature and where the binaries between [ ] represent a binary representation for that feature. Similar binary representations and maps can be generated and used to analyze other groupings, such as verb groupings, adjective groupings, etc.

By using a fixed length vector, a few limitations can be encountered. For example, for a short sentence, there can be wasted space in filling out the feature vector 310 with no-op tags. On other hand, for a long sentence, the prediction of the classifier 304 may not consider all the features of the sentence. However, using a fixed length that is not too short or too long can actually improve the detection of patterns and the accuracy of the prediction. To illustrate, consider another sentence example: "for California, show me the zip codes." This sentence can have the same groupings, features, and tags as the ones from the previous sentence example, but listed in a different order. This results in two different feature vectors for the two example sentences. Thus, if the entire example sentences were to be analyzed, the classifier 304 can output different predictions or an additional number of training sentences may be needed to train the classifier 304. In contrast, patterns of the groupings within each of the example sentences can be the same or similar. For example, the patterns of the groupings corresponding to "show me the zip codes" in the two example sentences would be the same. Thus, by analyzing sections of sentences (e.g., by using a fixed length window around words of interest), a lower number of training sentences may be needed. The classifier 304 can also output the same predictions for the two sentence examples.

In an embodiment, patterns can be analyzed according to a fixed length window around words of interest (or conversely, groupings of interest) to improve the prediction accuracy. This can allow an analysis of patterns locally around words (or groupings). For example, the window can be set to three or some other number of words, groupings, features, or tags. If a noun grouping is to be analyzed to predict whether that noun grouping should be in a certain part of the query structure 206 (e.g., to be classified as a select clause or as a where clause in an SQL query), a local pattern around that noun grouping can be analyzed. This pattern can include two other proximate groupings. Proximity includes the cases where the two other groupings precede, are adjacent, or follow the noun grouping. To illustrate, consider the sentence example of "show me the zip codes in California." A corresponding feature vector includes "VX, PRP, DT, NN, NN, IN, NNP." If the noun grouping corresponding to "zip" is considered, an analyzed pattern can include the groupings corresponding to a word before (e.g., "the") and a word after (e.g. "codes") and thus can be "DT, NN, NN."

Once the feature vector 310 is generated according to a fixed length, the corresponding binary map 312 can be analyzed through the machine-learning algorithm (e.g., random forest) to detect the patterns and accordingly measure the differences or distances between the features. From these distances, the machine-learning algorithm can output probabilities of what grouping belong to what clause of the query statement 124, thus predicting the query structure 206. Conversely, these probabilities can be used to determine what word should be added to what clause. To illustrate, consider again the example sentence of "Show me the zip codes in California." If a determination is to be made as to whether the nouns should belong to a select clause or a where clause, or should not belong to any clause of an SQL statement, the classifier 204 can output the following probabilities for the nouns based on an analysis of the corresponding noun groupings. For "zip:" $p_{no-clause}=0$, $P_{select}=0.99$, and $p_{where}=0.01$; for "codes:" $p_{no-clause}=0$, $p_{select}=0.95$, and $p_{where}=0.05$; and for "California:" $p_{no-clause}=0.02$, $p_{select}=0.13$, and $p_{where}=0.85$, where $p_{no-clause}$ indicates the probability of not belonging to a clause, $p_{select}$ indicates the probability of belonging to the select clause, and $p_{where}$ the probability of belonging to the where clause. As such, by selecting the highest probability for each noun, the SQL statement would include "zip codes" in the select clause and "California" in the where clause.

Once generated, the query statement 124 can be inputted to the augmenter 306. The augmenter 306 is configured to receive and process the query statement 124 to output the expanded query statement 208. For example, the augmenter 306 can expand the query statement 124 by adding terms related to the words added to the query statement 124. To do so, the augmenter 306 may have access to and use a generic domain structure 316. This structure 316 represents a structure for storing terms and relationships between the terms from different domains. For example, the generic domain structure 316 can include thesauri, the WordNet database, a lexicon ontology, or a knowledge dataset that stores triples, entity dictionaries, and mention dictionaries. An example knowledge dataset is further described in co-pending U.S. patent application Ser. No. 14/538,393, filed concurrently herewith, entitled "ORGANIZING DATA IN A DATASET", which is incorporated herein by reference in its entirety. Briefly, a triple can represent relationships between two words expressed as, for example, a predicate between a subject and an object. Entity and mention dictionaries can represent a mechanism to search the knowledge dataset to find triples. A lexicon ontology can represent a tree structure storing relationships between terms and can be generated by exploring the relationships stored in a knowledge dataset as described in co-pending U.S. patent application Ser. No. 14/538,393, filed concurrently herewith, entitled "ORGANIZING DATA IN A DATASET".

In addition to the abstractor 302, the classifier 304, and the augmenter 306, the query engine 122 can implement a number of other modules. For example, an execution engine module (not shown in FIG. 3) can be used. This module can generate an executable query command from the expanded query statement 208 and can dispatch the command to the appropriate SQL or NoSQL database engine. For example, the execution engine module can use a data engine type tag in the query command to determine the database engine. In the case of SQL queries, the command can be dispatched to an Oracle relational database engine. In the case of NoSQL queries, the command can be dispatched to an HBASE or MongoDB engine.

In another example, the query engine 122 can implement a grader and filter module (not shown in FIG. 3). This module can score query results and filter out certain ones based on a set of criteria. Scoring can allow ordering the query results in a relevance order, while filtering can allow removing the results that may not be too relevant. In an embodiment, a score of a query result can be based on a rank received from the dispatched query engine. For example, the rank from an SQL database engine can use a term frequency-inverse document frequency (TF-IDF) value. In addition, the score can be based on whether an actual word from the natural language sentence 202 or whether a related term was used. For instance, the score can be expressed as: score=rank×path similarity×hierarchy score, where rank is computed from the TF-IDF value, path similarity is computed by WordNet between the term being searched and the original term, and the hierarchy score is computed based on a match between the searched term and terms in the lexicon ontology formed from the triples. An example process for computing the hierarchy score is further described in co-pending U.S. patent application Ser. No. 14/538,393, filed Nov. 11, 2014, entitled "COLLECTING, ORGANIZING, AND SEARCHING KNOWLEDGE ABOUT A DATASET". Briefly, this process considers whether the two terms are synonyms, hypernyms, or equivalents, the frequency of triples using the searched term, and identifying the other terms by using transitive clauses formed from the triples.

One set of criteria for the filtering can consider a threshold. For example, a cutoff difference of two, or some other value, between the highest scoring match and the rest of the matches can be used. As such, any match with a score difference to the best score that is greater than two gets filtered out. This value can be adjusted to change the recall of the queries.

Another set of filtering criteria can be based on a clause of the query statement. For example, for a where clause in an SQL query, the actual words for that where clause can be expanded to find the related terms. However, rather than submitting a query using the related terms in the where clause, an option can be presented to a user at a user interface to select one or more related terms. This approach can allow learning and tracking the user's choices and subsequently making automatic expansion decisions.

In yet another example, the query engine 122 can implement one or more classifiers similar to the classifier 304. In particular, to determine whether a word belongs to a query clause, a classifier can analyze a corresponding grouping. Thus, to analyze whether a noun belongs to one clause and whether an adjective belongs to another clause, two analyses should be performed: one for the noun and one for the adjective. A single classifier can be configured to perform both and other analyses. However, to speed up the analyses, multiple classifiers can be used in parallel. Some of the classifiers can be uniquely configured to analyze particular word types (e.g. one classifier can be set to analyze nouns, one to analyze adjectives, etc.).

Figure 4:
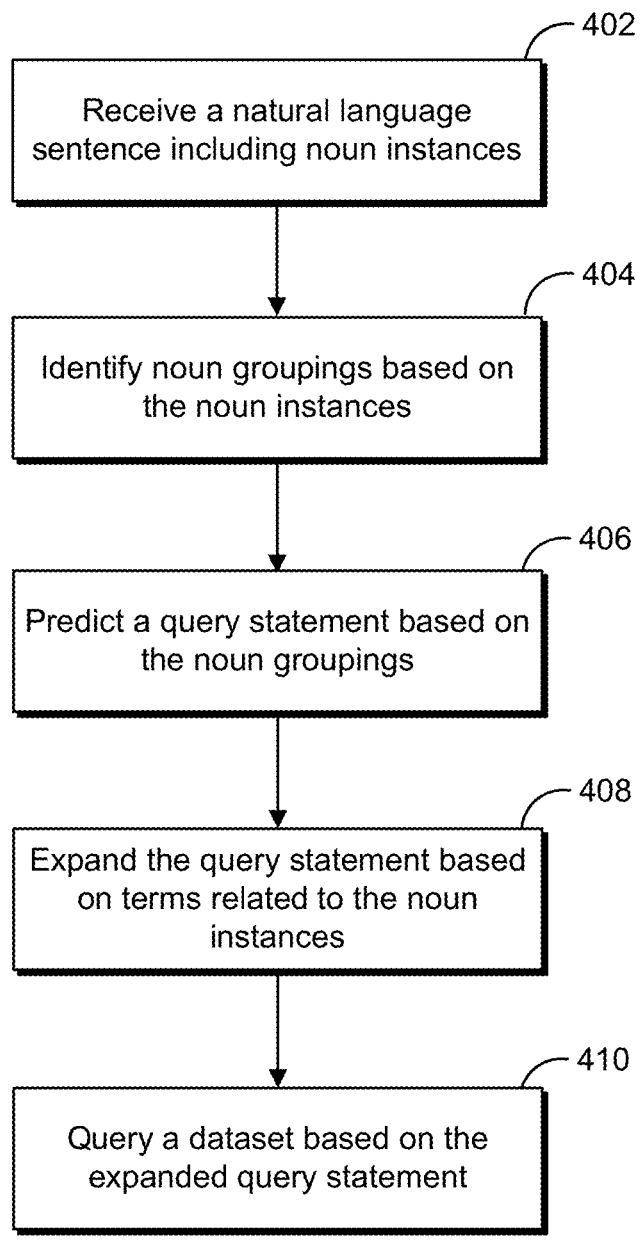
FIG. 4 illustrates an example flow for querying a dataset, according to certain embodiments of the present invention.
Figure 5:
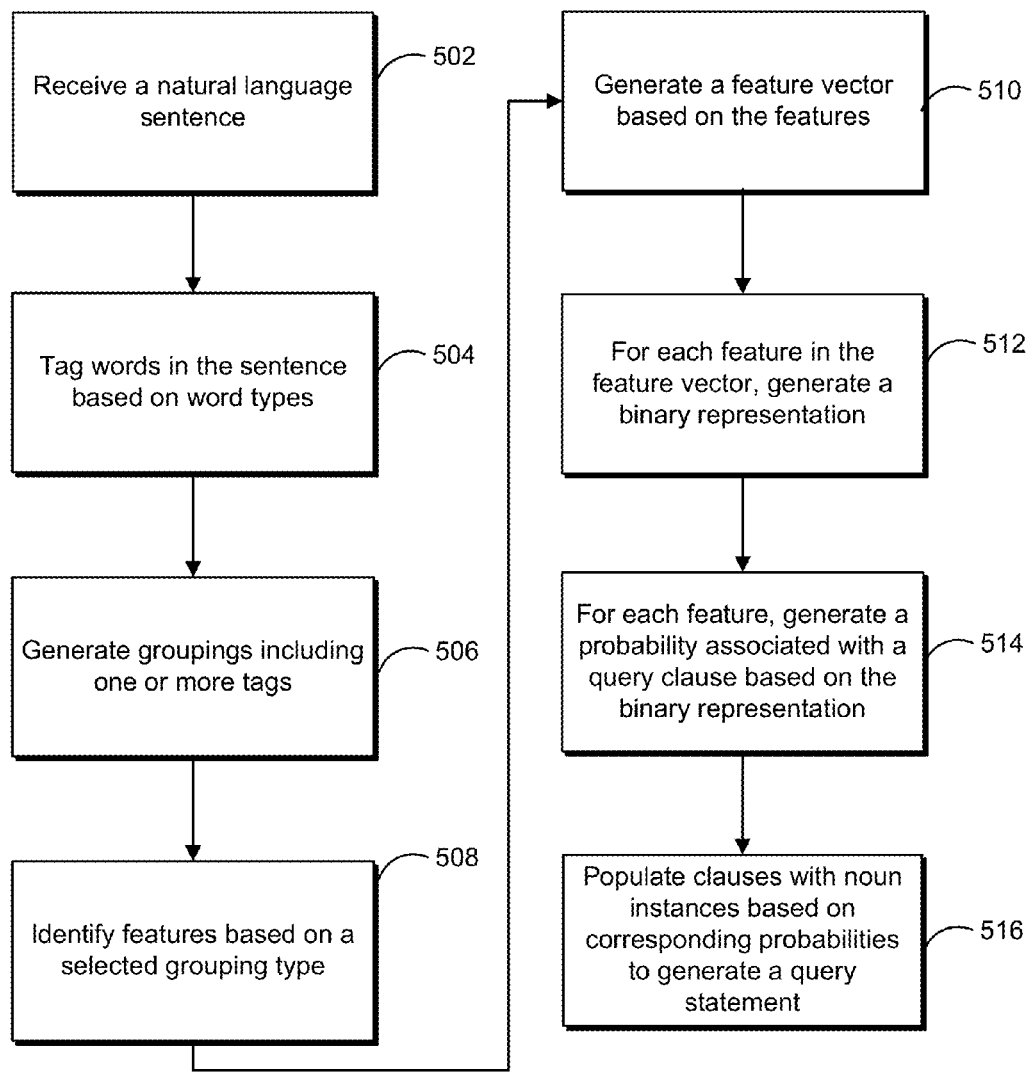
FIG. 5 illustrates an example flow for generating a query statement, according to certain embodiments of the present invention.

Turning to FIGS. 4-5, those figures illustrate example flows for generating a query statement and querying a dataset. In particular, FIG. 4 illustrates an example flow for generating the query statement and accordingly querying the dataset. In comparison, FIG. 5 illustrates another example flow for generating the query statement. Some of the operations between the example flows of FIGS. 4-5 may be similar. In the interest of clarity of explanation, such similarities are not repeated herein.

In the interest of clarity of explanation, the example flows of FIGS. 4-5 also illustrate generating an SQL query statements having two clause classes (a select clause and a where clause) based on an analysis of nouns and noun groupings. However, the flows are not limited as such. Instead, the flows can be similarly applied to analyzing other types of words and groupings (e.g., verbs and verb groupings, adjective and adjective groupings, etc.). The flows can also be similarly applied to generate other query statements. For example, the flows can be used to generate SQL query statements with other clause classes (e.g., a "from" clause, "an order by" clause, etc.) and NoSQL query statements. To illustrate, consider an example of a NoSQL database storing who, what, when, where, and how many attributes. In this example, a NoSQL query statement can be generated to query one or more of these attributes. This can involve analyzing words and groupings to match them to query clauses specific to querying the one or more attributes.

Furthermore, the example flows of FIGS. 4-5 similarly apply to training a query engine (e.g., a classifier of the query engine) or to generating query statements for actual queries. The difference between the two include whether training sentences or actual sentences are inputted to the query engine. In the interest of clarity of explanation, the example flows illustrate the use of actual sentences.

In the illustrative operations, each of the operations or functions may be embodied in, and fully or partially automated by, modules executed by one or more processors of a computing device. These modules may correspond to, for example, the modules of the query engine 122. An example computing device implementing such modules is further illustrated in FIG. 6. Additionally, while the operations are illustrated in a particular order, it should be understood that no particular order is necessary and that one or more operations may be omitted, skipped, and/or reordered.

Turning to FIG. 4, that figure illustrates an example flow that a query engine, such as the query engine 122, may perform to generate a query statement, such as an SQL query, and query a dataset, such as a relational database. As illustrated, the example flow includes predicting an SQL structure from groupings corresponding to words in a natural language sentence. This prediction includes determining what nouns from the words belong to a select clause and what nouns belong to a where clause. The nouns can then be added to these clauses based on the prediction to generate the query statement. The query statement can be expanded to include related terms. A query execution command can be generated and dispatched accordingly to the relational database. Query results received in response to the command can be ranked and filtered.

The example flow of FIG. 4 starts at operation 402, where the query engine receives a natural language sentence including noun instances. A noun instance corresponds to an actual noun word, such as "zip" in a "show me the zip codes in California" example sentence. The natural language sentence can be received from a computing device hosting, for example, a personal assistant application.

At operation 404, the query engine identifies noun groupings based on the noun instances. For example, the query engine can detect words in the natural language sentence that are nouns, and can tag these words with a noun tag. The query engine can similarly also detect and tag other types of words. This can involve processing the natural language sentence through one or more of a sentence segmenter, a tokenizer, a part-of-speech tagger, and an grouping tagger. Based on the tags (e.g., noun tags, verb tags, adjective tags, determiner tags, etc.), the query engine can group one or more tags together to form groupings. For example, two consecutive noun tags or a determiner tag adjacent to a noun tag can be grouped together to form a noun grouping. This process can be repeated across the tags to generate the noun groupings, along with other types of groupings.

At operation 406, the query engine predicts a query statement based on at least the noun groupings. This prediction can involve using a multi-hierarchical machine learning classifier. In particular, the prediction can include predicting a query structure based on the noun groupings and then adding the noun instances to the structure to generate the query statement. For example, local patterns around the noun groupings can be analyzed to predict which noun groupings belong to the select clause and which other noun groupings belong to the where clause of the query statement. A local pattern around a noun grouping can be formed by including the noun grouping and a number of other groupings in proximity of the noun grouping. Noun instances corresponding to the noun groupings can then be added to either the select clause or the where clause according to the prediction to generate the query statement.

At operation 408, the query engine expands the query statement based on terms related to the noun instances. For example, the query engine can access multiple sources such as a WordNet database, a lexicon ontology, a number of thesauri, or other structures storing relationships between words. For some or each of the noun instances, the query engine can look up and receive related terms from one or more of the sources. The query engine can also receive from the source(s) similarity scores indicating how similar the related terms are to the original noun instances. Once identified, the query engine can add some or all of the related terms to the query statement, thereby expanding the query statement. In an example, for noun instances belonging to the where clause, rather than expanding these noun instances with related terms, the query engine may present an option at a user interface for a selection of one or more of the related terms.

At operation 410, the query engine queries a dataset based on the expanded term. For example, the query engine can generate an executable query command based on the expanded query statement and can dispatch this command to an SQL database engine. In response, the query engine can receive query results along with corresponding ranks (e.g., TF-IDF values). Thereafter, the query engine can score the query results based on the ranks and the similarity scores to determine relevancies of the query results. Filtering can then be applied based on a set of criteria (e.g., cutoff thresholds) to remove less relevant query results.

Turning to FIG. 5, an example flow for generating a query statement is illustrated. The example flow starts at operation 502, where a query engine receives a natural language sentence. At operation 504, the query engine tags words in the natural language sentence based on corresponding word types. For example, noun instances are tagged with noun tags, verb instances are tagged with verb tags, and so on and so forth.

At operation 506, the query engine generates groupings including one or more tags. For example, the query engine can group a noun tag with other proximate tags to generate a noun grouping. For remaining non-noun tags (e.g., a verb tag), the query engine can generate a non-noun grouping (e.g., a verb grouping) per non-noun tag. Each non-noun grouping can include a separate non-noun tag.

At operation 508, the query engine identifies features based on a selected grouping type. For example, to analyze the noun groupings to generate an SQL query statement, the query engine may set the grouping type to noun groupings. Based on this selection, the query engine determines the features from the groupings. For example, for each non-noun grouping, a feature can be identified and can include the non-noun grouping (or the corresponding non-noun tag). For each noun grouping, the query engine determines the noun and non-noun tags that the noun grouping includes. A feature is then identified for each of these tags.

At operation 510, the query engine generates a feature vector based on the features. For example, the feature vector can have a fixed length and can represent an array that stores some or all of the features identified at operation 508. If the number of features is smaller than the fixed length, no-op tags can be added. In contrast, if the number of features is larger than the fixed length, some of the features can be added to another feature vector instead.

At operation 512, the query engine can generate a binary representation for each feature in the feature vector. A binary representation of a feature can depend on the tag that the feature includes (or, conversely, on the grouping type that the feature corresponds to). For example, if a feature includes a noun tag, a corresponding binary representation can have a set of binaries. In comparison, if another feature includes a verb tag, a corresponding binary representation can have another set of binaries. The binary representations of the features collectively form a binary map.

At operation 514, the query engine generates a probability associated with a query clause based on the binary representation. This probability can indicate whether a noun instance should be added to a select clause or to a where clause. For example, by selecting noun groupings at operation 508, the query engine can generate for each noun instance a set of probabilities, where each probability is associated with the select clause, the where clause, or a no clause. The highest probability of the three can be used to determine that the noun instance should be added to the corresponding clause (or not to any clause).

To generate these probabilities, the query engine can analyze local patterns around the noun groupings, rather than the noun instances. This can involve using a machine-learning algorithm, such as a random forest. In particularly, the bit map can be inputted to the random forest algorithm. Using the bit map, this algorithm would then compute differences between the features generated from the groupings. The differences can be associated with patterns (e.g., the smaller the distance is, the more similar two patterns associated with the features (or the groupings) may be). The algorithm can output the probabilities as a function of the differences.

At operation 516, the query engine populates clauses with noun instances based on corresponding probabilities to generate a query statement. For example, if for one noun instance, the highest associated probability points to the select clause, that noun instance can be added to the select clause. In comparison, if for another noun instance, the highest associated probability points to the where clause, that noun instance can be added to the where clause. As such, the query statement can include the select and where clauses populated with the noun instances.

Figure 6:
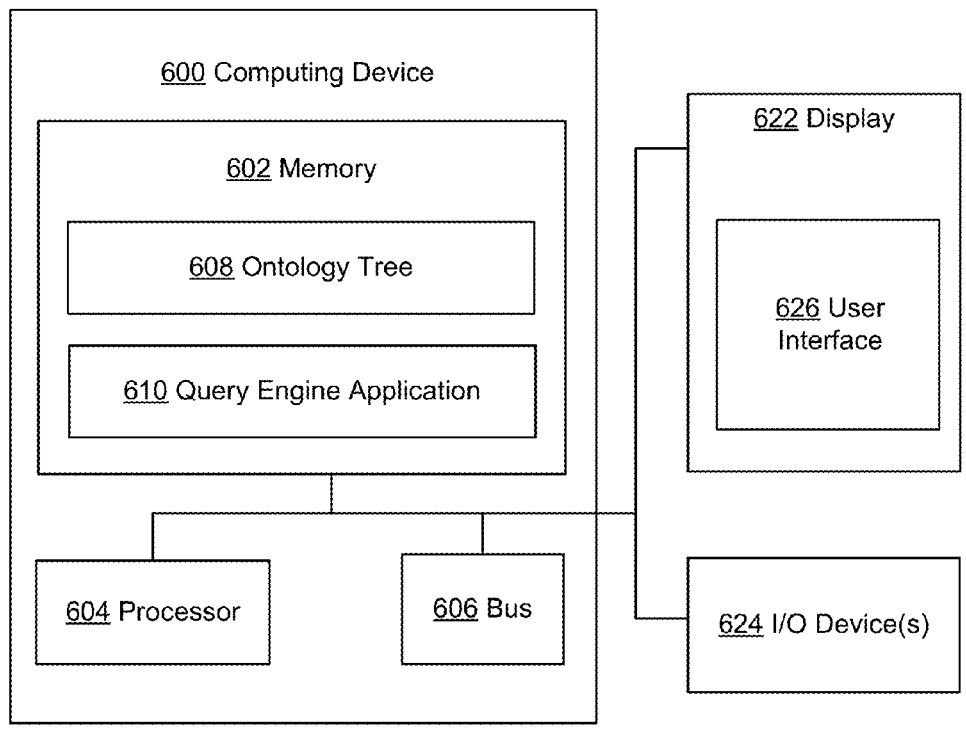
FIG. 6 illustrates an example computing device for generating a query statement, according to certain embodiments of the present invention.

Turning to FIG. 6, that figure illustrates an example computing device 600 that can be configured to implement a query engine, described herein above. The computing device 600 can for example, access a natural language search, detect words, generate associated groupings, predict a query structure based on the groupings, and generate a query statement by adding the words to the structure. To do so, the computing device 600 can store the various modules of the query engine, such as an abstractor, a classifier, an augmenter, an execution engine, a grader and filter. These modules may be separate or may be integrated in a single module. In addition, the computing device 600 can store locally, or remotely on a storage device, a dataset to be queried and term sources (e.g., WordNet database, thesauri, lexicon ontology tree, triples, etc.).

As used herein, the term "computing device" refers to any computing or other electronic equipment that executes instructions and includes any type of processor-based equipment that operates an operating system or otherwise executes instructions. A computing device will typically include a processor that executes program instructions and may include external or internal components such as a mouse, a CD-ROM, DVD, a keyboard, a display, or other input or output equipment. The example computing device 600 can be used as special purpose computing devices to provide specific functionality offered by hosted applications and by the interaction between these hosted applications. As an example, the computing device 600 is shown with a display 622 and various input/output devices 624. An example input/output device 624 includes a receiver or a network interface for receiving information, such as source file, content, or other type of data, from another computing device in a peer-to-peer configuration or over a network. A bus, such as bus 606 and bus 136, will typically be included in the computing device 600 as well.

In an embodiment, to implement a query engine, the computing device 600 includes a query engine application 610. This application may implement the various modules, functions, features, and operations described herein above. As used herein, the term "application" refers to any program instructions or other functional components that execute on a computing device. An application may reside in the memory of a computing device that executes the application. As is known to one of skill in the art, such applications may reside in any suitable computer-readable medium and execute on any suitable processor. For example, as shown the computing device 600 has a computer-readable medium such as memory 602 coupled to a processor 604 that executes computer-executable program instructions and/or accesses stored information. The processor 604 may include a microprocessor, an ASIC, a state machine, or other processor, and can be any of a number of computer processors. Such processors include, or may be in communication with, a computer-readable medium which stores instructions that, when executed by the processor, cause the processor to perform the operations described herein.

A computer-readable medium may include, but is not limited to, an electronic, optical, magnetic, or other storage device capable of providing a processor with computer-readable instructions. Other examples include, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and Action-Script.

The query engine application 610 can integrate the modules of the query engine described above. As such, the query engine application 610 analyzes natural language sources to query a dataset. In an embodiment, the query engine application 610 expands the query by including related terms. The query engine application 610 can determine such terms by using an ontology tree 608, or another term source, stored for example in the memory 602 of the computing device 600.

To facilitate interactions with a user, the computing device 600 may support a user interface 626. The user interface can be displayed to the user on the display 622 connected to the computing device 600. By operating the I/O devices 624 (e.g., a keyboard and a mouse), the user interacts with, for example, the query engine application 610.

Figure 7:
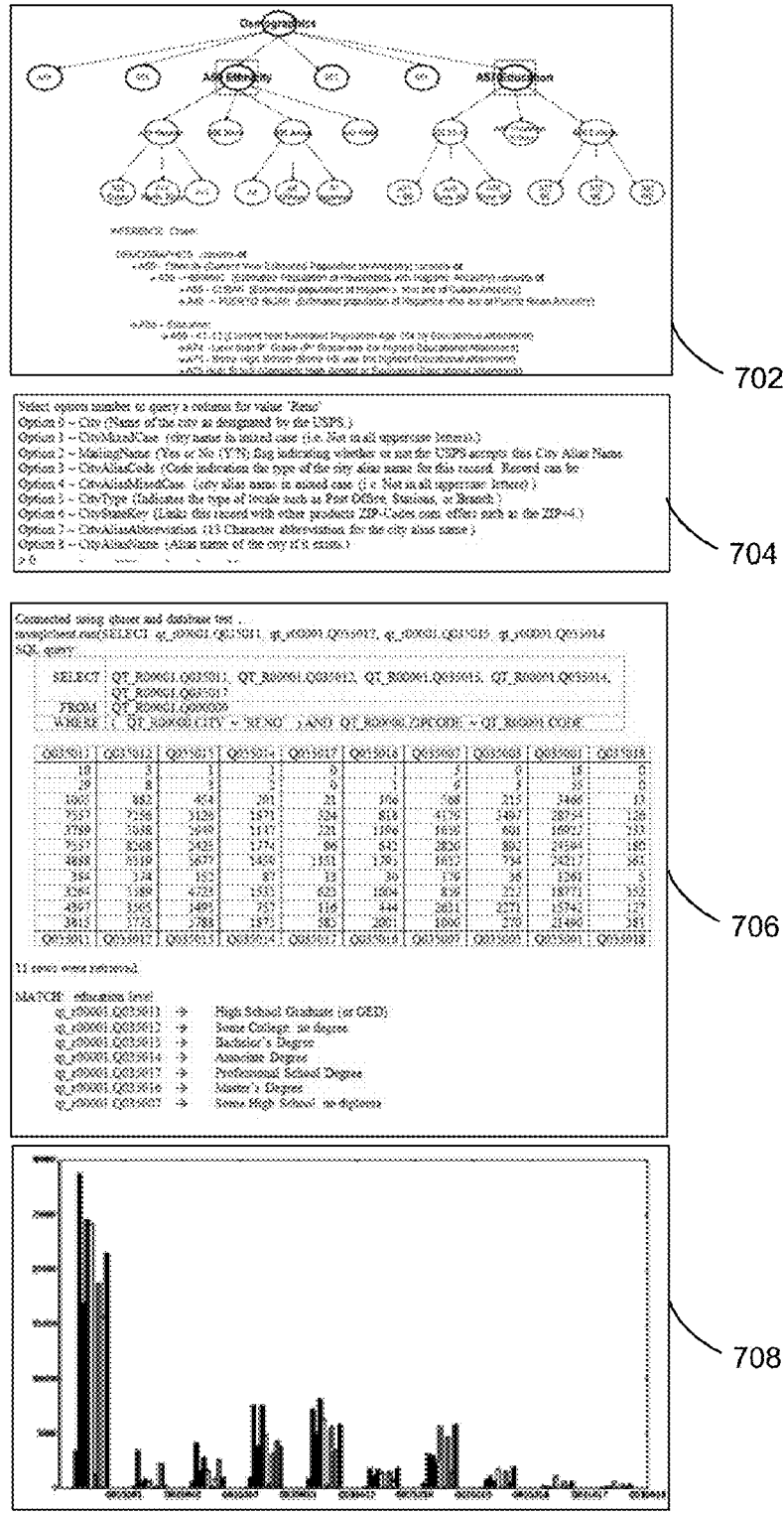
FIG. 7 illustrates an example query result, according to certain embodiments of the present invention.

Turning to FIG. 7, different types of query results are illustrated. For example, a query engine can rank query results based on whether original words from a search or whether related terms were used. As illustrated, the query engine can access an ontology tree 702 to identify the related terms. As part of using related terms, the query engine may present options 704 to select one or more of the related terms at user. In addition, the query engine can present the ranked query results at the user interface using different formats. For example, one format includes presenting intermediate results or query results in a table format 706. In another example, the query results are visualized in an analytics reports and rollups 708.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention claimed is:

1. A computer-implemented method comprising:
   identifying words from a natural language request to search a dataset;
   associating each of the words with an identifier that identifies a part of speech type of the corresponding word;
   generating groupings of identifiers of the words, each of the groupings comprising a respective set of the identifiers associated with a set of the words, and each of the groupings corresponding to a particular part of speech type, the identifiers comprising a noun tag;
   providing the words and the groupings to a machine learning classifier to generate a structured query to the dataset, the machine learning classifier configured to:
     select a structure of the structured query for a noun grouping based on the groupings by at least predicting that a word associated with the noun tag in the noun grouping belongs to a select clause or a where clause of the structure, and
     generate the structured query by using, in the structure, the set of words associated with the set of the identifiers of the noun grouping, wherein using the set of words comprises adding the word to the select clause or the where clause; and querying the dataset based on the structured query provided from the machine learning classifier.

2. The computer-implemented method of claim 1, wherein selecting the structure of the structured query comprises comparing a pattern formed by the identifiers in the groupings to data based on previous observations for patterns of multiple structured queries by using a similarity or distance function.

3. The computer-implemented method of claim 1, further comprising:

identifying terms related to the one or more of the words based on at least a lexical ontology structure storing relationships between the terms and the one or more of the words, wherein the lexical ontology structure is generated based on a plurality of datasets;

adding the terms to an element of the structured query;

receiving query results based on using the structured query to query the dataset;

receiving query results based on using the structured query to query the dataset; and ranking the query results based on whether a query result was generated based on a term from the lexical ontology structure.

4. The computer-implemented method of claim 1, wherein:

associating each of the words with an identifier comprises identifying that the word is a noun and tagging the word with the noun tag, and generating the groupings comprises generating the noun grouping comprising the noun tag.

5. The computer-implemented method of claim 1, wherein the structure of the structured query comprises the select clause, the where clause, a from clause, or an order by clause, and wherein selecting the structure of the query comprises:

selecting a noun from the words or the noun grouping from the groupings;

if the noun is selected, selecting, from the groupings, the noun grouping corresponding to the noun to predict whether the noun grouping corresponds to the select clause;

generating a vector comprising features, wherein the features comprise identifiers of the noun grouping and a subset of the groupings;

providing an input based on the vector to the machine learning classifier;

identifying a probability that the noun grouping corresponds to the select clause, the where clause, the from clause, or the order by clause, wherein the probability is based on an output of the machine learning classifier in response to the input; and adding, based on the probability, the noun to the select clause, the where clause, the from clause, or the order by clause.

6. The computer-implemented method of claim 1, wherein selecting the structure of the query statement class comprises:

selecting a grouping from the groupings, the grouping comprising one or more identifiers corresponding to one or more words;

generating a binary representation based on the one or more word identifiers of the grouping;

inputting the binary representation and the value to a random forest classifier; and predicting that the one or more words belong to an element of the structure based on an output of the random forest classifier.

7. The computer-implemented method of claim 1, wherein selecting the structure of the structured query comprises:

selecting the word from the words;

selecting, from the groupings, the noun grouping associated with the word;

selecting, from the groupings, a set of groupings based on proximity to the noun grouping;

identifying a pattern based on the noun grouping and the set of the groupings; and predicting the structure based on the pattern.

8. The computer-implemented method of claim 1, wherein the structured query comprises a structured query language (SQL) query, wherein the structure of the SQL query comprises the select clause or the where clause, wherein the words comprise a noun, and further comprising:

identifying a term related to the noun;

detecting whether the noun is to be added to the select clause or the where clause;

adding the term to the select clause based on detecting that the noun is to be added to the select clause; and providing an option on a user interface to add the term to the where clause based on detecting that the noun is to be added to the where clause.

9. The computer-implemented method of claim 1, wherein the natural language request is generated based on a natural language utterance associated with a search for information.

10. The computer-implemented method of claim 1, further comprising:

determining that the natural language request is associated with the query to the dataset;

detecting whether the dataset comprises a relational database or a noSQL database;

structuring the structured query to include a SQL statement if the dataset comprises the relational database; and structuring the structured query statement to include a NoSQL statement if the dataset comprises the NoSQL database.

11. A system comprising:

a processor; and a memory communicatively coupled to the processor and bearing instructions that, upon execution by the processor, cause the system to at least perform operations comprising:

receiving natural language text comprising words;

generating expressions from the natural language text based on the words, each of the expressions comprising at least an identifier of a part of speech type corresponding to a word from the words, and each of the expressions corresponding to a particular part of speech type, the expression comprising a noun expression that includes a noun tag identifying a noun as one of the words; and predicting, by using a machine learning classifier, at least a clause of a query statement for the noun expression based on the expressions, and wherein the machine learning classifier is configured to:

select a structure of the query statement by at least predicting that a word associated with the noun tag in the noun expression belongs to a select clause or a where clause of the structure, and generate the query statement based on adding the word to the select clause or the where clause.

12. The system of claim 11, wherein the natural language text is generated based on unstructured input received from a personal assistant application hosted on a computing device, wherein the unstructured input comprises one or more of: a natural language utterance or a natural language text input.

13. The system of claim 11, wherein the natural language text is generated based on unstructured input to search a dataset, wherein the dataset comprises annotations of content of the dataset, wherein the unstructured input is independent of the annotations, and wherein the query statement is configured to query the dataset based on the annotations without limiting the unstructured input.

14. The system of claim 11, wherein predicting the clause of the query statement comprises:
  selecting, from the expressions, the noun expression comprising the noun tag, the noun tag associated with a potential class for the clause;
  selecting a subset of the expressions based on proximity of the subset to the noun expression;
  detecting a pattern based on the noun expression and the subset; and
  predicting that the clause has a particular class based on the pattern.

15. The system of claim 11, predicting the clause of the query statement comprises:
  providing data associated with the expressions to the machine learning classifier; and
  detecting the clause based on an output of the machine learning classifier, the output comprising probabilities that the expression is associated with the clause.

16. The system of claim 11, wherein predicting the clause of the query statement is based on providing data associated with the expressions to the machine learning classifier, wherein the machine learning classifier is trained based on vectors comprising identifiers of part of speech types.

17. The system of claim 11, wherein:
  the natural language text is associated with a search for attributes from a web site analytics database, wherein the attributes comprise one or more of: a who attribute, a what attribute, a when attribute, a where attribute, or a how many attribute associated with visitors of a web site,
  generating the expressions comprises selecting the noun expression associated with a word, and
  predicting the clause comprises predicting that the noun expression is associated with an attribute from the attributes and setting the clause based on the attribute.

18. A non-transitory computer-readable storage medium storing instructions that, when executed on a computing device, configure the computing device to perform operations comprising:
  receiving natural language text;
  classifying one or more words from the natural language text as a noun;
  associating the one or more words with a noun tag based on the classifying;
  generating an expression comprising the noun tag; and
  predicting, by using a machine learning classifier, a clause of a query statement for the expression based on a pattern associated with the expression and other expressions, the other expressions generated based on tags associated with classified words or terms from the natural language text, wherein the machine learning classifier is configured to:
    select a structure of the query statement by at least predicting that the one or more words associated with the noun tag in the expression belongs to a select clause or a where clause of the structure, and
    generate the query statement by adding the one or more words associated with the noun tag of the expression to the select clause or the where clause.

19. The non-transitory computer-readable storage medium of claim 18, wherein the natural language text is received to train the machine learning classifier, wherein the machine learning classifier is used to predict the clause of the query statement and is trained based on the expression and the other expressions.

20. The non-transitory computer-readable storage medium of claim 18, wherein the instructions, when executed on the computing device, further configure the computing device to perform operations comprising:
  identifying first terms related to words from the natural language text based on a dictionary storing synonyms of the words;
  identifying second terms related to the words based on an ontology tree storing relationships of the words with other words;
  adding the first terms and the second terms to the query statement;
  receiving query results based on submitting the query statement to a dataset; and
  ranking the query results based on whether a query result was generated based on the words, the first terms, or the second terms.

* * * * *